(12) United States Patent
Laferte et al.

(10) Patent No.: US 12,359,102 B2
(45) Date of Patent: Jul. 15, 2025

(54) HOT MELT ADHESIVE COMPOSITION

(71) Applicant: BOSTIK SA, Colombes (FR)

(72) Inventors: Olivier Laferte, Venette (FR); Clement Bellini, Venette (FR); Urszula Duplaga, Venette (FR)

(73) Assignee: BOSTIK SA, Colombes (FR)

( * ) Notice: Subject to any disclaimer, the term of this patent is extended or adjusted under 35 U.S.C. 154(b) by 437 days.

(21) Appl. No.: 17/785,128

(22) PCT Filed: Dec. 17, 2020

(86) PCT No.: PCT/EP2020/086783
§ 371 (c)(1),
(2) Date: Jun. 14, 2022

(87) PCT Pub. No.: WO2021/123000
PCT Pub. Date: Jun. 24, 2021

(65) Prior Publication Data
US 2022/0396720 A1 Dec. 15, 2022

(30) Foreign Application Priority Data
Dec. 20, 2019 (EP) .................................... 19306715

(51) Int. Cl.
| | | |
|---|---|---|
| *C09J 123/22* | (2006.01) | |
| *B32B 7/12* | (2006.01) | |
| *B32B 27/32* | (2006.01) | |
| *B32B 27/34* | (2006.01) | |
| *B32B 27/36* | (2006.01) | |
| *C09J 5/06* | (2006.01) | |
| *B32B 5/02* | (2006.01) | |

(52) U.S. Cl.
CPC ............... *C09J 123/22* (2013.01); *B32B 7/12* (2013.01); *C09J 5/06* (2013.01); *B32B 5/022* (2013.01); *B32B 27/32* (2013.01); *B32B 27/34* (2013.01); *B32B 27/36* (2013.01); *B32B 2255/02* (2013.01); *B32B 2255/10* (2013.01); *B32B 2255/26* (2013.01); *B32B 2270/00* (2013.01); *B32B 2555/02* (2013.01); *C09J 2423/00* (2013.01)

(58) Field of Classification Search
None
See application file for complete search history.

(56) References Cited

U.S. PATENT DOCUMENTS

| | | |
|---|---|---|
| 5,185,398 A | 2/1993 | Kehr et al. |
| 5,723,546 A † | 3/1998 | Sustic |
| 2018/0030317 A1 | 2/2018 | Fujinami et al. |
| 2018/0282450 A1 | 10/2018 | Muvundamina et al. |
| 2018/0282451 A1 * | 10/2018 | Carvagno .............. C08K 11/00 |
| 2019/0322901 A1 | 10/2019 | Turner et al. |
| 2019/0322909 A1 † | 10/2019 | Turner |

FOREIGN PATENT DOCUMENTS

| | | |
|---|---|---|
| CN | 106255735 A | 12/2016 |
| EP | 0442045 B1 † | 3/2013 |

OTHER PUBLICATIONS

EPO: Third Party Observation for corresponding European Patent Application No. 20833832.7, mailed Apr. 29, 2024, 4 pages.
REXTAC LLC, APAO Polymers & Adhesives, Production Specification—Adhesives & Sealants, 1 page.
ISA/EP; International Search Report and Written Opinion for International Patent Application No. PCT/EP2020/086783 dated Mar. 10, 2021, 9 pages.
Product line list—REXTAC LLC, https://www.rextac.com/wp-content/uploads/2019/08/REXtac_Product-Line-List_2019-R1.pdf (last visited Aug. 10, 2023).†

* cited by examiner
† cited by third party

*Primary Examiner* — Sheeba Ahmed
(74) *Attorney, Agent, or Firm* — NK Patent Law

(57) ABSTRACT

The present invention relates to a hot melt adhesive composition having an enthalpy of crystallization below 5 J/g and comprising: a) at least 60% by weight of a composition a) comprising: —at least one copolymer A having a needle penetration higher than 15 dmm; —at least (co)polymer B having a needle penetration lower than 15 dmm; b) from 0% to 30% by weight of at least one tackifying resin.

20 Claims, No Drawings

HOT MELT ADHESIVE COMPOSITION

CROSS-REFERENCE TO RELATED APPLICATIONS

This application is a U.S. National Stage application of International Patent Application No. PCT/EP2020/086783, filed on Dec. 17, 2020, which claims the benefit of European Patent Application No. 19306715.4, filed on Dec. 20, 2019.

The present invention relates to a hot melt adhesive composition comprising a combination of specific (co)polymers.

The present invention also relates to the uses of said hot melt adhesive composition.

BACKGROUND

Disposable hygiene articles are made from a wide variety of substrates (non-woven, elastomeric material, film, such as polyolefin film and in particular polyethylene or polypropylene film) bonded with adhesive materials. Among examples of disposable hygiene articles, mention may be made of diapers, napkins or adult incontinence disposable articles. The disposable hygiene articles are produced at high speed line rates. In such production, hot melt adhesives are typically used because they can be easily applied to substrates (at the molten state) and rapidly develop strong bond upon cooling, without any additional manufacturing steps such as solvent removal.

Generally, several kinds of hot melt adhesives can be found in disposable hygiene articles, depending on their emplacement and final function, such as:
  Core adhesives: used to keep in place the diaper core (fluff and SuperAbsorbentPolymer "SAP"), during the manufacture of the diaper but also during the use of the diaper mainly after that said diaper has been wet;
  Construction adhesives: which bind the polyethylene back sheet to the nonwoven substrates or which bind two nonwoven substrates;
  Elastic adhesives: used to bind elastic strands to polyethylene "PE" (or to polypropylene "PP") and Nonwoven substrates.

Styrenic bloc copolymers based adhesive are the main hot melt adhesives used in the absorbing articles industry (core, elastic and construction applications). Over the years, polyolefin based adhesives have been formulated, thanks to development of new polyolefins copolymers (Amorphous Poly-Alpha-Olefins "APAO" by Ziegler-Natta and then by Metallocene catalysis).

Disposable hygiene market is more and more demanding on performance and processability robustness, as well as low odor level. Currently, cohesion, adhesion and processability are three properties that show antagonist interactions. It is therefore difficult to have hot melt adhesive compositions exhibiting a good compromise of these properties.

Hot melt "construction adhesives" are used for the permanent construction (or assembly) by bonding of the various substrates, by means of a laminating process. The corresponding materials are selected among various nonwoven materials or low surface energy thermoplastic films, such as polylactic acid, polyethylene, or polypropylene. Mention may be made, as an example of such permanent assemblies in the case of diapers, of the lamination of a PolyEthylene (PE) sheet with a nonwoven cloth of PolyPropylene (PP), the latter giving a silky appearance pleasing to the eye and to the touch.

The required level of cohesion for such permanent assemblies (or laminates) is usually quantified by a "peel" test.

It is preferred that hot melt construction adhesives provide strong peel strength, particularly at low coating weight such as 1 to 4 grams per square meter.

Typically, the current hot melt adhesive compositions based on polyolefin do not provide laminate with good maintenance of the cohesion performances after ageing at temperatures higher than 50° C. However, it is necessary to have hot melt adhesive compositions with stable cohesion performance both at initial and over time at high temperature. Indeed, the disposable nonwoven hygiene products, such as diapers, are sold all over the world even in countries wherein the daily temperature is high (for example higher than 40° C.). The disposable nonwoven hygiene products face high temperature in those countries but also during transport and/or storage.

There is thus a need for new improved hot melt adhesive composition, which are suitable as constructions adhesive for disposable nonwoven hygiene products.

There is in particular a need for new hot melt adhesive composition which provides laminates with adequate initial peel strength, in particular at low coating weights ranging more particularly from 1 to 4 grams per square meter.

There is a need for new hot melt adhesive composition which provides laminates with adequate initial peel strength, and good peel strength over time at high temperature for example at temperature higher than 50° C. for at least 3 weeks.

There is also a need for new hot melt adhesive composition which provides laminates with a good compromise between good adhesive and good peel strength over time at high temperature for example at a temperature higher than 50° C. for at least 3 weeks.

DESCRIPTION OF THE INVENTION

The present invention relates to a hot melt adhesive composition having an enthalpy of crystallization below 5 J/g and comprising:
  a) at least 60% by weight of a composition a) comprising:
    at least one copolymer A having a needle penetration higher than 15 dmm;
    at least (co)polymer B having a needle penetration lower than 15 dmm;
  b) from 0% to 30% by weight of at least one tackifying resin.

The contents of the above mentioned ingredients a) and b) in the hot melt adhesive composition according to the invention are given in percentage by weight and are expressed relatively to the total weight of the hot melt adhesive composition according to the invention.

A. Hot Melt Adhesive Composition

Composition a)

As used herein, the term "(co)-polymer" covers both a homopolymer and a copolymer.

As used herein, the term "copolymer" refers to polymer formed by the polymerization of at least two different monomers. The term "copolymer" can include terpolymers which contain three types of different monomers.

The composition a) may have a viscosity at 149° C. ranging from 1 000 mPa·s to 30 000 mPa·s, preferably from 4 000 mPa·s to 20 000 mPa·s, and more preferably from 5 000 mPa·s to 15 000 mPa·s.

The viscosity is a Brookfield viscosity measured according to ASTM D3236 at 149° C.

Preferably, the composition a) comprises at least 30% by weight of copolymer(s) A, preferably at least 35% by weight, and even more preferably at least 40% by weight of copolymer(s) A based on the total weight of said composition a).

The composition a) may comprise from 30% to 90% by weight of copolymer(s) A, preferably from 35% to 80% by weight, and even more preferably from 40% to 70% by weight of copolymer(s) A based on the total weight of said composition a).

Preferably, the composition a) comprises at least 20% by weight of (co)polymer(s) B, preferably at least 25% by weight, and even more preferably at least 30% by weight of copolymer(s) B based on the total weight of said composition a).

The composition a) may comprise from 20% to 80% by weight of (co)polymer(s) B, preferably from 25% to 70% by weight, and even more preferably from 30% to 60% by weight of (co)polymer(s) B, based on the total weight of said composition a).

The composition a) may have an enthalpy of crystallization ranging from 0 J/g to lower than 5 J/g, e more preferably from 1.0 J/g to 4.5 J/g, and even more preferably from 1.5 to 4.5 J/g.

According to the invention, the enthalpy of crystallization is determined by DSC analysis. In particular, on a Mettler DSC analyzer, a sample of 10 mg is cooled from 23° C. under nitrogen flow to −70° C. for 5 minutes. Then, the rate of increase of temperature is adjusted to 10° C./min from −70° C. to 200° C. After reaching 200° C., the rate of decrease of temperature of the sample is adjusted to −10° C./min until reaching −70° C.

In one embodiment, the composition a) consists essentially of, preferably consists of:
- at least one copolymer A having a needle penetration higher than 15 dmm, and preferably having an enthalpy of crystallization below 5 J/g;
- at least (co)polymer B having a needle penetration lower than 15 dmm and preferably having an enthalpy of crystallization below 5 J/g.

In a preferred embodiment, the composition a) comprises:
- one copolymer A having a needle penetration higher than 15 dmm, and an enthalpy of crystallization below 5 J/g;
- one copolymer B having a needle penetration lower than 15 dmm and an enthalpy of crystallization below 5 J/g.

The hot melt adhesive composition may comprise from 60% to 99% by weight of the composition a) as defined herein, preferably from 60% to 95% by weight, more preferably from 60% to 90% by weight, and even more preferably from 70% to 90% by weight, based on the total weight of said hot melt adhesive composition.

Copolymer A

The copolymer A may comprise from 30 weight % to 80 weight %, preferably from 40 weight % to 80 weight % of 1-butene monomer units.

Preferably, the copolymer A comprises more than 50 weight % of 1-butene monomer units.

The copolymer A may comprise one or more $C_{2-20}$ α-olefin monomer units.

In a preferred embodiment, the copolymer A comprise from 30 weight % to 70 weight % of $C_{2-20}$ α-olefin monomer units.

The $C_{2-20}$ α-olefin monomer units may be selected from the group consisting of: ethylene, propylene, pentene, dodecene-1, hexadodecene-1, decene-1, nonene-1, heptane-1, hexane-1, propene, dimethylpentene-1, methylnonene-1, trimethylheptene-1,4-methyl-1-pentene, dimethylpentene-1, ethylpentene-1, methylpentene-1, trimethylpentene-1, and mixtures thereof.

Preferably, the $C_{2-20}$ α-olefin monomer units are selected from the group consisting of propylene units, ethylene units and mixtures thereof.

In a preferred embodiment, the copolymer A comprises from 30 weight % to 70 weight % of $C_{2-20}$ α-olefin monomer units selected from the group consisting of: ethylene, propylene, and mixture thereof.

The percentage of monomer units may be determined by a suitable method, such as nuclear magnetic resonance known to those of skill in the part.

Preferably, the copolymer A has an enthalpy of crystallization below 5 J/g, preferably ranging from 1 to 5 J/g, more preferably ranging from 2 to 5 J/g, and even more preferably ranging from 2 to 4 J/g.

In a preferred embodiment, the copolymer A has an enthalpy of crystallization below 4 J/g.

The weight average molecular weight of copolymer A may range from 10 000 g/mol to 100 000 g/mol, preferably from 20 000 g/mol to 75 000 g/mol.

Weight average molecular weight is characterized using a High Temperature Size Exclusion Chromatograph (SEC) using a polystyrene reference standard.

The copolymer A has a needle penetration higher than 15 dmm, preferably higher than 17 dmm, even more preferably higher than 18 dmm.

In one embodiment, the copolymer A has a needle penetration lower than 30 dmm, preferably lower than 25 dmm.

According to the invention, the needle penetration is measured according to the DIN EN 1426 with some modifications: the copolymer is heated up to 180° C. in a thin can. After 24 h (time needed for recrystallization of the amorphous copolymers), the hardness of the copolymer is determined with a needle and weight of 100 g at 25° C., with a penetration time into the sample of 5 s.

As used herein, the term "dmm" means decimillimeters.

The copolymer A may have a density at 23° C. measured according to ASTM D1505 of about 0.80 g/cm$^3$ to about 0.90 g/cm$^3$, preferably of about 0.85 g/cm$^3$ to about 0.88 g/cm$^3$.

As an example of copolymer A, Vestoplast® EP 2094 commercialized by Evonik, is a butene-rich copolymer having a viscosity at 190° C. of 2 500 MPa·s., a needle penetration of 20 dmm, and an enthalpy of crystallization of 3.7 J/g. Other examples are Eastoflex® E1045 PL, Eastoflex® E1003 from EASTMAN or Vestoplast® 751 from EVONIK.

(Co)polymer B

The (co)polymer B may be a homopolymer or a copolymer. Preferably, the (co)polymer B is a copolymer.

The (co)polymer B may comprise from 30 weight % to 80 weight %, preferably from 40 weight % to 80 weight % of 1-butene monomer units.

Preferably, the (co)polymer B comprises more than 50 weight % of 1-butene monomer units.

The (co)polymer B may comprise one or more $C_{2-20}$ α-olefin monomer units.

In a preferred embodiment, the (co)polymer B comprise from 30 weight % to 70 weight % of $C_{2-20}$ α-olefin monomer units.

The $C_{2-20}$ α-olefin monomer units may be selected from the group consisting of: ethylene, propylene, pentene, dodecene-1, hexadodecene-1, decene-1, nonene-1, heptane-1, hexane-1, propene, dimethylpentene-1, methylnonene-1, trimethylheptene-1,4-methyl-1-pentene, dimethylpentene-1, ethylpentene-1, methylpentene-1, trimethylpentene-1, and mixtures thereof.

Preferably, the $C_{2-20}$ α-olefin monomer units are selected from the group consisting of propylene units, ethylene units and mixtures thereof.

In a preferred embodiment, the (co)polymer B comprises from 30 weight % to 70 weight % of $C_{2-20}$ α-olefin monomer units selected from the group consisting of ethylene, propylene, and mixture thereof.

The percentage of monomer units may be determined by a suitable method, such as nuclear magnetic resonance known to those of skill in the part.

Preferably, the (co)polymer B has an enthalpy of crystallization below 5 J/g, preferably ranging from 1 to 5 J/g, more preferably ranging from 2 to 5 J/g, and even more preferably ranging from 2 to 4 J/g.

In a preferred embodiment, the (co)polymer B has an enthalpy of crystallization below 4 J/g.

The weight average molecular weight of (co)polymer B may range from 10 000 to 100 000 g/mol, preferably from 20 000 to 75 000 g/mol.

The (co)polymer B has a needle penetration lower than 15 dmm. Preferably, the (co)polymer B has a needle penetration higher than 5 dmm, even more preferably higher than 8 dmm, and in particular higher than 10 dmm.

The (co)polymer B may have a density at 23° C. measured according to ASTM D1505 of about 0.85 g/cm³ to about 0.90 g/cm³, preferably of about 0.86 g/cm³ to about 0.88 g/cm³.

As an example of (co)polymer B, Vestoplast® 508 commercialized by Evonik, is a butene-rich copolymer having a viscosity at 190° C. of 8 000 MPa·s., a needle penetration of 14 dmm, and an enthalpy of crystallization of 3.7 J/g. Other examples are Vestoplast® 703 or Vestoplast® EP V2103 from EVONIK.

Tackifying Resin

The hot melt adhesive composition of the invention comprises from 0% to 30% by weight of at least one tackifying resin.

Preferably, the content of tackifying resin(s) ranges from 1% to 30% by weight, preferably from 5% to 30% by weight, and even more preferably from 10% to 30% by weight, based on the total weight of said hot melt adhesive composition.

Said tackifying resin(s) may comprise one or several carbon-carbon double bond(s) or may comprise no carbon-carbon double bond. In this latter case, saturated tackifying resin(s) may be prepared by total hydrogenation of the insaturated tackifying resin(s).

The tackifying resin is preferably selected among the following classes:
(a) natural and modified rosins such as for example, gum rosins, wood rosins, tall-oil rosins, distilled rosins, hydrogenated rosins, dimerized rosins and polymerized rosins;
(b) glycerol and pentaerythritol esters of natural and modified rosins, such as for example the glycerol esters of pale wood rosin, the glycerol esters of hydrogenated rosin, the glycerol esters of polymerized rosin, the pentaerythritol esters of pale wood rosin, the pentaerythritol esters of hydrogenated rosin, the pentaerythritol esters of tall oil rosin and the phenolic modified pentaerythritol esters of rosin;
(c) polyterpene resins include hydrogenated polyterpene resins having a Ring and Ball softening point of from about 20° C. to 140° C., the latter polyterpene resins generally resulting typically from the polymerization of terpene hydrocarbons, such as for example the monoterpene known as pinene, in the presence of Friedel-Crafts catalysts at moderately low temperatures;
(d) phenolic-modified terpene resins such as for example those resulting from the condensation, in an acidic medium, of a terpene and a phenol;
(e) aliphatic (including cycloaliphatic) petroleum hydrocarbon resins (C5) having a Ring and Ball softening point of from about 60° C. to 140° C., said resins resulting from the polymerization of C5-hydrocarbon monomers; and the corresponding hydrogenated derivatives resulting from a subsequent total or partial hydrogenation thereof;
(f) aromatic petroleum hydrocarbons resins (C9) having Ring and Ball softening point of from about 60° C. to 140° C., said resins resulting from the polymerization of C9-hydrocarbon monomers; and the corresponding hydrogenated derivatives resulting from a subsequent total or partial hydrogenation thereof;
(g) aliphatic (including cycloaliphatic) and/or aromatic petroleum resins (C5/C9) having a Ring and Ball softening point of from about 60° C. to 140° C., said resins resulting from the polymerization of C5/C9-hydrocarbon monomers; and the corresponding hydrogenated derivatives resulting from a subsequent total or partial hydrogenation thereof.

As example of C5-hydrocarbon monomers useful to prepare the tackifying resins belonging to class (e) or (g), mention may be made of trans-1,3-pentadiene, cis-1,3-pentadiene, 2-methyl-2-butene, dicyclopentadiene, cyclopentadiene, cyclopentene, and any mixture thereof.

As example of C9-hydrocarbon monomers useful to prepare the tackifying resins belonging to class (f) or (g), mention may be made of vinyltoluenes, dicyclopentadiene, indene, methylstyrene, styrene, methylindenes, and any mixture thereof.

As example of commercially available tackifying resin(s) belonging to class (a), mention may be made of:
  unmodified natural tall oil rosins from KRATON Company sold under the trade names SYLVAROS® (85, 90 and NCY),
  the partially hydrogenated rosin from EASTMAN Company sold under the trade name FORALYN® E and the fully hydrogenated rosin from Eastman sold under the trade name FORAL® AX-E,
  the dimerized rosin from EASTMAN Company sold under the trade name DYMEREX®.

As example of commercially available tackifying resin(s) belonging to class (b), mention may be made of:
  SYLVALITE® RE 100L, a pentaerythritol based tall-oil rosin ester, and
  SYLVALITE® RE 85L, a glycerol ester of tall oil rosin, both available from KRATON Company.

As example of commercially available tackifying resin(s) belonging to class (c), mention may be made of:
  the polyterpene tackifiers from KRATON Company sold under the trade names SYLVAGUM® TR and SYLVARES® TR series (7115, 7125, A25L, B115, M1115).

As example of commercially available tackifying resin(s) belonging to class (d), mention may be made of:
  the terpene phenol resins from KRATON Company sold under the trade names SYLVARES® TP (96, 2040, 300, 7042, 2019).

As example of commercially available tackifying resin(s) belonging to class (e), mention may be made of:

the aliphatic and cycloaliphatic petroleum hydrocarbon resins based on a C5-petroleum hydrocarbon fraction (such as a mixture of trans-1,3-pentadiene, cis-1,3-pentadiene, 2-methyl-2-butene, dicyclopentadiene, cyclopentadiene, cyclopentene), having a Ring and Ball softening point ranging from 60° C. to 140° C., from EASTMAN Company sold under the trade names WINGTACK® 98, WINGTACK® ET and from EXXONMOBIL sold under the trade name ESCOREZ® 1310LC, the partially aliphatic and cycloaliphatic petroleum hydrocarbon resins based on a C5-petroleum hydrocarbon fraction (such as a mixture of trans-1,3-pentadiene, cis-1,3-pentadiene, 2-methyl-2-butene, dicyclopentadiene, cyclopentadiene, cyclopentene), having a Ring and Ball softening point ranging from 80° C. to 140° C., from KOLON Company sold under the trade names SUKOREZ® SU210 and SUKOREZ® 230. The softening point of SUKOREZ® SU210 is 110° C.

the fully hydrogenated cycloaliphatic petroleum hydrocarbon resins based on a dicyclopentadiene-petroleum hydrocarbon fraction, having a Ring and Ball softening point ranging from 60° C. to 140° C., from EXXONMOBIL sold under the tradename ESCOREZ® 5400 series (5400, 5415, 5490). The softening point of ESCOREZ® 5400 is 100° C.

As example of commercially available tackifying resin(s) belonging to class (f), mention may be made of:

the aromatic petroleum hydrocarbon resins based on a C9-hydrocarbon petroleum fraction (such as a mixture of vinyltoluenes, dicyclopentadiene, indene, methylstyrene, styrene, methylindenes), having a Ring and Ball softening point of from about 60° C. to 140° C., available from KOLON INDUSTRIES sold under the trade names HIKOTACK® (P-90, P110 S and P120 S).

As example of commercially available tackifying resin(s) belonging to class (g), mention may be made of:

the partially hydrogenated cycloaliphatic modified aromatic petroleum hydrocarbon resins based on C5/C9-hydrocarbon petroleum fractions, having a Ring and Ball softening point of from about 60° C. to 140° C., from EXXONMOBIL Company sold under the tradename ESCOREZ® 5600 series (5600, 5615, 5690). The softening point of ESCOREZ® 5600 is 100° C.

the non hydrogenated aliphatic modified aromatic hydrocarbon petroleum resin based on C5/C9-hydrocarbon petroleum fractions sold by ZEON under the trade name QUINTONE® DX390N, with a softening point of 93° C.

According to a preferred embodiment, the Ring and Ball (or softening point) of the tackifying resin(s) preferably lies in the range from 90° C. to 125° C., and even more preferably in the range from 90° C. to 115° C.

The softening temperature (or point) is determined in accordance with the standardized ASTM E 28 test, the principle of which is as follows. A brass ring about 2 cm in diameter is filled with the resin to be tested in the melt state. After cooling to room temperature, the ring and the solid resin are placed horizontally in a thermostated glycerol bath, the temperature of which may vary by 5° C. per minute. A steel ball about 9.5 mm in diameter is centered on the solid resin disk. The softening temperature is, during the rise in temperature of the bath at a rate of 5° C. per minute, the temperature at which the resin disk flows by an amount of 25.4 mm under the weight of the ball.

Plasticizer

The hot melt adhesive composition may comprise plasticizer(s).

Any plasticizer known to a person skilled in the art may be used.

Non limiting examples of plasticizers include olefin oligomers, low molecular weight polyolefins such as liquid polybutene, low molecular weight non-aromatic polymers, phthalates, mineral oils such as naphtenic oils, paraffinic oils, waxes, vegetable and animal oils and derivatives thereof.

The plasticizer includes polyethylenes, polypropylenes, polybutenes, polyisobutylenes, hydrogenated polyisoprenes, hydrogenated polybutadienes, or the like having average molecular weight between about 350 g/mole and about 10 000 g/mole. Suitable vegetable and animal oils include glycerol esters of the usual fatty acids and polymerization products thereof.

Waxes can be used to reduce the melt viscosity of the hot melt adhesive composition. Mention can be made of the following waxes:

1. low molecular weight, that is, number average molecular weight (Mn) equal to 500-6000 g/mole, polyethylene having a hardness value, as determined by ASTM method D-1321, of from about 0.1 to 120, having an ASTM softening point of from about 65° C. to 140° C.;
2. petroleum waxes such as paraffin wax having a melting point of from about 50° C. to 80° C. and microcrystalline wax having a melting point of from about 55° C. to 100° C., the latter melting points being determined by ASTM method D 127-60;
3. synthetic waxes made by polymerizing carbon monoxide and hydrogen such as Fischer-Tropsch wax; and
4. polyolefin waxes. As used herein, the term "polyolefin wax" refers to those polymeric or long-chain entities comprised of olefinic monomer units. This type of materials is commercially available from Westlake Chemical Corporation, Houston, TX under the tradename designation "Epolene" and from Honeywell Corporation, Morristown, NJ under the trade name designation "A-C".

In a preferred embodiment, the hot melt adhesive composition does not comprise polyisobutylene, and even more preferably does not comprise plasticizer.

Optional Ingredients

Antioxidant

Preferably, the hot melt adhesive composition according to the invention comprises from 0.1% to 2% by weight of at least one antioxidant, relative to the total weight of the hot melt adhesive composition.

The antioxidant useful according to the invention is preferably incorporated in the hot melt adhesive composition to help protect the hot melt adhesive composition from chemical degradations. Said degradations generally involve the reactions of free radicals, resulting from chain scission catalyzed either by ultraviolet light or heat, with dioxygen. Such degradation is usually manifested by a deterioration in the appearance (browning of color) or other physical properties of the adhesive, and in the performance characteristics of the adhesive.

In particular, the antioxidant(s) protects the adhesive from the effect of thermal degradations reactions which mainly occur during the manufacturing and application process of the adhesive where the hot melt adhesive composition and its ingredients are heated for a long time at high temperature in presence of dioxygen.

Useful antioxidant(s) include hindered phenols and sulfur and phosphorus containing phenols. Hindered phenols are well known to those skilled in the art and may be characterized as phenolic compounds which also contain sterically bulky groups in close proximity to the phenolic hydroxyl group thereof. In particular, tertiary butyl groups generally are substituted onto the benzene ring in at least one of the ortho positions relative to the phenolic hydroxyl group.

Representative hindered phenols include:
1,3,5-trimethyl-2,4,6-tris(3-5-di-tert-butyl-4-hydroxybenzyl) benzene;
pentaerythritol tetrakis-3(3,5-di-tert-butyl-4-hydroxyphenyl) propionate;
n-octadecyl-3(3,5-ditert-butyl-4-hydroxyphenyl) propionate;
4,4'-methylenebis(4-methyl-6-tert-butylphenol);
4,4'-thiobis(6-tert-butyl-o-cresol);
2,6-di-tert-butylphenol;
6-(4-hydroxyphenoxy)-2,4-bis(n-octylthio)-1,3,5-triazine;
2,4,6-tris(4-hydroxy-3,5-di-tert-butyl-phenoxy)-1,3,5-triazine;
di-n-octadecyl-3,5-di-tert-butyl-4-hydroxybenzylphosphonate;
2-(n-octylthio)ethyl-3,5-di-tert-butyl-4-hydroxybenzoate;
sorbitol hexa-(3,3,5-di-tert-butyl-4-hydroxy-phenyl) propionate;
2,2'-methylene bis(4-methyl-6-tert-butylphenol)phosphites including, e.g., tris-(p-nonylphenyl)-phosphite (TNPP) and bis(2,4-di-tert-butylphenyl)4,4'-diphenylene-diphosphonite, di-stearyl-3,3'-thiodipropionate (DSTDP);
tetrakis(methylene(3,5-di-ter-butyl-4-hydroxyhydrocinnamate)) methane;
(tris(2,4-ditert-butylphenyl)phosphate), and combinations thereof.

The hindered phenol antioxidants may be used by themselves or in combination with other antioxidants, such as phosphites antioxidants like IRGAFOS® series, or aromatic amine antioxidants like NAUGARD® series from ADDIVANT.

Useful antioxidants are commercially available under a variety of trade designations including, e.g., the hindered phenolic antioxidants of IRGANOX® series from BASF including, e.g., IRGANOX® 1010 (tetrakis(methylene(3,5-di-ter-butyl-4-hydroxyhydrocinnamate)) methane), and IRGAFOS® 168 antioxidant (tris(2,4-ditert-butylphenyl) phosphate).

The total amount of antioxidant(s) is preferably ranging from 0.1 to 3% by weight, and more preferably from 0.4% to 1% by weight, relative to the total weight of the hot melt adhesive composition.

Other Ingredients

Other optional ingredient(s) may be incorporated into the hot melt adhesive composition according to the invention in order to modify some of its physical properties.

Among the optional ingredients, mention may be made of fillers, surfactants, colorants, ultraviolet light stabilizers, fluorescent agents, rheology modifiers, and the like.

The total amount of these optional ingredient(s) may range from 0% to 10% by weight, preferably from 0.1% to 5% by weight, and more preferably from 0.1% to 2% by weight, relative to the total weight of the hot melt adhesive composition.

Hot Melt Adhesive Composition

According to a preferred embodiment, the hot melt adhesive composition according to the invention has a Brookfield viscosity measured at 149° C. in the range of from 1 000 mPa·s to 30 000 mPa·s, preferably from 2 000 to 20 000, more preferably from 4 000 to 15 000 mPa·s. The Brookfield viscosity is measured in accordance with ASTM D-3236 using a Brookfield Thermosel viscometer.

The hot melt adhesive composition may comprise from 35% to 70% by weight of copolymer(s) A, preferably from 40% to 70% by weight of copolymer(s) A, and even more preferably from 40% to 60% by weight of copolymer(s) A based on the total weight of said hot melt adhesive composition.

The hot melt adhesive composition may comprise from 30% to 70% by weight of (co)polymer(s) B, preferably from 30% to 60% by weight of (co)polymer(s) B, and even more preferably from 30% to 50% by weight of (co)polymer(s) B, based on the total weight of said hot melt adhesive composition.

In the hot melt adhesive composition of the invention, the weight ratio copolymer(s) A:(co)polymer(s) B may range from 30:70 to 80:20, and preferably from 50:50 to 75:25.

The hot melt adhesive composition has an enthalpy of crystallization below 5 J/g. Preferably, the hot melt adhesive composition has an enthalpy of crystallization ranging from 0.5 J/g to lower than 5 J/g, even more preferably from 1.5 J/g to 4.5 J/g.

In one embodiment, the hot melt adhesive composition of the invention has an enthalpy of crystallization below 5 J/g and comprises:
a) at least 60% by weight of a composition a) comprising:
at least one copolymer A having a needle penetration higher than 15 dmm;
at least (co)polymer B having a needle penetration lower than 15 dmm;
b) from 0% to 30% by weight of at least one tackifying resin;
the copolymer A comprising one or more $C_{2-20}$ α-olefin monomer units, and
the (co)polymer B comprising one or more $C_{2-20}$ α-olefin monomer units.

In one preferred embodiment, the hot melt adhesive composition of the invention comprises:
a) from 70% to 99% by weight of the composition a) comprising:
a copolymer A having a needle penetration higher than 15 dmm and preferably having an enthalpy of crystallization below 5 J/g;
a copolymer B having a needle penetration lower than 15 dmm and preferably having an enthalpy of crystallization below 5 J/g;
both copolymer A and copolymer B comprising more than 50 weight % of 1-butene monomer units;
b) from 3% to 30% by weight of at least one tackifying resin.

The hot melt adhesive composition of the present invention may be produced using any of the techniques known in the art. The ingredients used are preferably mixed and heated at high temperature for at least several hours, typically at least 4 hours, and preferably from 4 to 6 hours, at a temperature ranging from 140° C. to 170° C.

The hot melt adhesive composition according to the invention can be prepared in presence of dioxygen (such as under air atmosphere), or preferably under inert atmosphere e.g. under carbon dioxide or nitrogen to limit potential degradation by oxidative reactions.

According to a preferred embodiment, the process to manufacture the hot melt adhesive composition according to the invention comprises:
a first step of mixing and heating the copolymer(s) A, the optional tackifying resin(s), preferably with antioxidant(s) when present, at a temperature ranging from 140° C. to 180° C., at least for a period of time long enough to obtain a homogeneous mixture;

a second step of adding the (co)polymer(s) B into the mixture obtained in the previous step under stirring and heating at a temperature ranging from 140° C. to 180° C., at least for a period of time long enough to obtain a homogeneous mixture.

Additionally, the process of the invention may comprise a step of applying vacuum to remove any entrapped air in the mixture, before or after any of the step of process described previously.

Other useful optional ingredient(s) which may be present in the hot melt adhesive composition according to the invention may be added at any step of the process according to the invention.

The hot melt adhesive composition according to the invention, prepared by the above-described process may further be kept, for example in a melting kettle, under melted state for up to an additional 15 hours before being cooled down and packaged in form of a ready-to-use solid composition.

B. Uses

The present invention concerns the use of the hot melt adhesive composition described herein in sanitary disposable consumer articles, for example, diapers, feminine care pads, and napkins. Articles can include items having any two or more substrates adhesively bonded by a hot melt adhesive composition, such as disposable articles such as diapers or feminine napkins.

The substrates can include thermoplastics, thermoset polymers, polyesters, polyethylene terephthalate, polyamides, nylons, polypropylene, and combinations, blends, or layered composites thereof. The substrates can include, in some applications, coatings of wax, acrylate polymers, or other materials, colorants, preservatives, stabilizers, processing lubricants, and combinations thereof. The substrates can include solid, nonporous or breathable films. The substrates can include nonwoven fabrics and films (e.g., polyethylene films), in some applications.

The hot melt adhesive compositions can be used as a construction adhesive in assembly of commonly available consumer disposal articles. Such articles include infant diapers, adult diapers, bed pads, sanitary products, and other absorbent articles. Combining at least a polymer film with other films and fibrous materials typically makes these articles. Fibrous materials can include fabrics such as woven or nonwoven fabrics, fibers in the form of fiber vats, fiber collections, fiber balls, etc.

Such absorbent articles typically include an absorbent held within the article. The absorbent is usually covered using a nonwoven inner liner. Such liners include a highly permeable material such as a spun bonded nonwoven structure that passes fluids or moisture from the interior of the article into the absorbent layer. The absorbent layer or structure formed within the absorbent article typically includes a fiber mass pad or cellulosic or wood pulp for the purpose of absorbing liquid or fluid materials released into the absorbent article. The fiber or fluff can include a cellulosic fiber, a synthetic fiber or mixtures thereof such as blends of wood fiber, cellulosic fiber, polyethylene fiber, polypropene fiber or other fiber materials often including a super absorbent material. Super or highly absorbent materials are used to increase the absorptive capacity of the absorbent article. Such materials are organic materials including modified natural gums and resins but often include synthetic polymer materials such as hydrogels. Carboxymethyl cellulose, alkaline metal salts of acrylic polymers, polyacrylamides, polyvinyl alcohol, polyethylene anhydride polymers and copolymers, polyvinyl ether polymers and copolymers, hydroxy alkyl cellulose polymers and copolymers, polyvinyl sulfonic acid polymers and copolymers, polyacrylic polymers, polyvinyl-pyrrolidone polymers and copolymers can be used in the absorbent function. Nonwoven fabric layers used in such disposal articles typically are generally planar structures including a bonded assembly of natural or synthetic fiber.

Such nonwoven materials are often made using a variety of techniques, including spun bonding, melt bonding, etc. Such nonwoven materials are often manufactured by randomly placing fibers or rovings in a random pattern and are then thermally bonded using inherent bonding characteristics of the fibers or by bonding the fibers using resin materials applied to the fibers. Various polymers can be used to make nonwoven materials including poly olefins, polyesters, ethylene vinyl acetate polymers, ethylene acrylic acid polymers and others. The exterior of the article often includes a polymer film that is liquid impervious. In certain aspects exterior polymer films can be further modified using additional exterior layers to obtain a more cloth like or nonwoven character to the exterior polymer film. The exterior film typically includes a single layer of a polymer film but can be a multi-layer film structure. Typical polymer sheet materials include high tensile strength polymers including polyesters, poly olefins or other thermoplastic sheet materials that can be formed into film layers. The polyolefin or polyester polymer materials are often formed into sheets and are treated to improve strength, flexibility and puncture resistance. Techniques including biaxial orientation, heat treatment or surface treatment can improve the film characteristics of the polymer films. Such polymer films often have a thickness that ranges from about 0.5 mils (e.g., one thousandth of an inch) to about 1.5 mils.

The absorbent articles can include a liquid impervious polymer film, an absorbent layer pad and a nonwoven interior layer. A three component structure can be assembled using the adhesive composition that is applied using manufacturing techniques that adheres the nonwoven interior layer to the polymer film while holding the absorbent layer there between.

The present application relates to a process of manufacturing an assembly product (or laminate) comprising:

a step (i) of heating at a temperature ranging from 130° C. to 180° C. the hot melt adhesive composition according to the invention, for at least a period of time long enough to render the hot melt adhesive composition liquid enough to be applied on a substrate (for example at least two hours at industrial scale), then a step (ii) of coating said composition on a primary substrate, then a step (iii) of putting into contact the coated surface of the primary substrate with the surface of a secondary substrate, so as to form an adhesive joint bonding the two substrates.

The substrates may be different or of same nature, with various forms (layer or film, strands, fluff)

Preferably each substrate may be chosen independently from one another among nonwoven fabric, tissue, absorbent fluff, super absorbent polymer (SAP), composite material, plastics which may be elastomeric or non elastomeric, and which may be chosen for example from Styrene Block Copolymers (SBC), Polyurethane, and Polyolefin, and any mixture thereof. The composite material may be made of at least one of the above-mentioned materials. A nonwoven fabric is defined as an interlocking fiber network characterized by flexibility, porosity and integrity. The individual fibers used to compose the nonwoven fabric may be synthetic, naturally occurring, or a combination of the two. The individual fibers may be mechanically, chemically or thermally bonded to each other.

The hot melt adhesive composition according to the invention can be coated or applied with a variety of application techniques known in the art, which include contact type application (such as slot die coating) and non-contact type application (such as spraying, fiberization or comb slot application).

In particular, as mentioned above, the hot melt adhesive composition according to the invention can be applied easily through conventional coating nozzles, such as those having a diameter from 0.305 to 0.762 mm or a slot die length adjustable by a shim and ranging from 20 µm to 300 µm.

The amount of coated adhesive by surface unit can vary in a very large range from 0.1 to 50 g/m$^2$, depending on the substrates intended to be bonded. For example one may cite a range from 0.2 to 1 g/m$^2$ in case of nonwoven substrates bonded with the polyethylene film to produce a cloth-like backsheet assembly, while a range from 3 to 7 g/m$^2$ can be used in case of the assemblies of the disposable multilayers. A much higher range, from 20 to 40 g/m$^2$, can also be used when high shear performance is requested, like for instance for bonding the elastic side panels or the fastening tapes to the diaper chassis.

Before being applied on the surface of the primary substrate, the hot melt adhesive composition according to the invention may further be kept in a melting kettle for up to 4 days.

The hot melt adhesive composition according to the invention can be applied on a substrate or stored in presence of dioxygen (under air atmosphere), or preferably under inert atmosphere to limit degradations due to oxidative reactions.

According to another aspect, the present application also relates to an assembly product comprising at least two substrates bonded by at least one hot melt adhesive composition according to the invention.

The substrates bonded may be chosen among the substrates listed above for the process of applying the hot melt adhesive composition, according to the invention.

The hot melt adhesive composition according to the invention may be used as the laminating adhesive to bind a plurality of substrate layers for example to manufacture toilet tissues, paper towels, wipes and other consumer products, particularly absorbent articles such as disposable hygiene products, and more particularly disposable diapers.

In a particular embodiment of the invention, the assembly product according to the invention may be a multilayer product comprising at least two layers of substrate(s) bonded by at least one hot melt adhesive composition according to the invention.

In the assembly product according to the invention, the at least two layers of substrate(s) may be joined adhesively by a layer of hot melt adhesive composition according to the invention, in sandwich between the two layers of substrate(s).

Alternatively or cumulatively, the at least two layers of substrate(s) may be joined adhesively by spots of hot melt adhesive composition according to the invention.

Preferably, the assembly product is a disposable nonwoven absorbent article.

The hot melt composition according to the invention advantageously leads to laminates with adequate initial peel strength, and good peel strength over time at high temperature for example at temperature higher than 50° C. for at least 3 weeks.

The hot melt adhesive composition advantageously provides laminates with a good compromise between good adhesive and good peel strength over time at high temperature for example at a temperature higher than 50° C. for at least 3 weeks.

According to the present invention, by «comprised between x and y», or «ranging from x to y», it is meant a range wherein limits x and y are included. For example, the range "comprising between 1% and 3%" includes in particular 1% and 3%.

The following examples are given purely by way of illustration of the invention and should not, under any circumstances, be interpreted as limiting the scope thereof.

EXPERIMENTAL PART

Test Methods

The enthalpy of crystallization is determined by DSC analysis. On a Mettler DSC analyzer, the sample of 10 mg is cooled from 23° C. under nitrogen flow to −70° C. for 5 minutes. Then, the rate of increase of temperature is adjusted to 10° C./min from −70° C. to 200° C. After reaching 200° C., the rate of decrease of temperature of the sample is adjusted to −10° C./min until reaching −70° C.

Needle penetration is measured according to the DIN EN 1426 with some modifications: the copolymer is heated up to 180° C. in a thin can. After 24 h (time needed for recrystallization of the amorphous copolymers), the hardness of the copolymer is determined with a needle and weight of 100 g at 25° C., with a penetration time into the sample of 5 s.

The following ingredients were used for the preparation of the hot melt adhesive compositions:

VESTOPLAST® EP V2094 (commercialized by EVONIK): 1-butene rich α-olefin copolymer with a low viscosity at 190° C. of 2500 MPa·s, a needle penetration of 20 dmm and an enthalpy of crystallization of 3.7 J/g;

VESTOPLAST® 508 (commercialized by EVONIK): 1-butene rich α-olefin copolymer with a viscosity at 190° C. of 8000 MPa·s, a needle penetration of 14 dmm and an enthalpy of crystallization of 3.7 J/g;

AERAFIN® 17 (commercialized by EASTMAN): polyethylene/polypropylene copolymer with a low viscosity at 190° C. of 1700 MPa·s, a needle penetration of 20 dmm and an enthalpy of crystallization of 24 J/g;

VISTAMAXX® 8880 (commercialized by EXXONMOBIL): primarily composed of isotactic propylene repeat units with 6 weight % of ethylene, having a low viscosity at 190° C. of 1200 MPa·s, and an enthalpy of crystallization of 34 J/g;

ESCOREZ® 5400 (commercialized by EXXONMOBIL): a fully hydrogenated cycloaliphatic petroleum hydrocarbon resins based on a dicyclopentadiene-petroleum hydrocarbon fraction, having a Ring and Ball softening point ranging of 103° C.;

INDOPOL® H100 (commercialized by INEOS): liquid polybutene oligomer with a viscosity at 100° C. between 200 and 235 mPa·s and a molecular weight of 910 g/mol;

IRGANOX 1010: Phenolic primary anti-oxydant: pentaerytritol tetrakis(3-(3,5-di-tert-butyl-4-hydroxyphenyl))propionate A1—Preparation of the Hot Melt Adhesive Compositions The compositions of example 1 in Table 1 according to the invention are prepared by simple mixing of its ingredients.

Resins, copolymer A and stabilizer are mixed together and heated at 160° C. until everything dissolved as a homogeneous mixture. Then, copolymer B is added at the same temperature until everything dissolved as a homogeneous mixture. At the end, the mixture is cooled down and collect to be used as it.

The compositions of example 1 in Table 1 from comparative examples D and E are prepared by simple mixing of its ingredients. The copolymer A and stabilizer are mixed together and heated at 160° C. until everything dissolved as a homogeneous mixture. Then, copolymer B is added at the same temperature until everything dissolved as a homogeneous mixture. Then, INDOPOL H-300 is added to fluidify the mixture. At the end, the mixture is cooled down and collect to be used as it.

A2—Preparation of a Laminate A2 by Means of a Comb Slot Signature™ Coating Equipment:

A laminate A2 is prepared as follows:

Use is made, as a laminating device, of a machine operating continuously at a line speed of approximately 200 m/minute, which machine is sold by NORDSON under the name of Coater CTL 4400.

In this machine, the coating nozzle is a signature spray nozzle (NORDSON comb slot Signature™).

The two substrates employed are:
- a 13 μm thick PE film which has a width of 20 cm, and
- a 15 g/m2 spunmelt nonwoven sheet of the same width, which is composed of fibers of polypropylene (PP).

These two substrates are packaged as a reel with a width of 20 cm.

The compositions of example 1 are heated in the melting pot at a temperature of 155° C.

It is then coated at the same temperature of 155° C. and at a coating weight of approximately 5 g/m2 on the PE film.

The resulting coating pattern is quite adequate and is typical of a good sprayability (and processability). It corresponds to a 2.54 cm wide non-continuous layer, which is made of an offset spiraled bead, which is centered on said PE film and along an axis, which is perpendicular to the axis of the reel.

The nonwoven (PP) sheet is then put into contact with the coated surface of the PE film by means of a nip roll applying a pressure of 1 bar.

A3—Peel Measured Initially and after Aging at 23° C., for Laminate A2:

The laminate A2 obtained is then packaged as a reel and left for 24 hours at ambient temperature and at 50% relative humidity.

A rectangular strip measuring 25 mm by approximately 10 cm is then cut out in the coated central area of the laminate.

The two individual substrates are separated, starting from one end of the above rectangular strip (as a test specimen) and over approximately 2 cm.

The two free ends thus obtained are fixed to two clamping devices respectively connected to a stationary part and a movable part of a tensile testing device which are located on a vertical axis.

While a drive mechanism communicates, to the movable part, a uniform speed of 300 mm/minute, resulting in the separation of the two substrates, the separated ends of which are gradually displaced along a vertical axis while forming an angle of 180°, the stationary part, connected to a dynamometer, measures the force withstood by the test specimen thus held.

The result corresponding to the peel after 24 hours at 23° C., is expressed in N/25 mm.

The peel after, respectively, 4 weeks at 55° C., is measured by repeating the above protocol except that the assembly obtained after lamination is aged during the respective time at 55° C., then measured at 23° C. after 24 h at 23° C., is expressed in N/25 mm.

The results are reported in Table 2 below.

Example 1: Hot Melt Adhesive Compositions a, B, C, D and E

The hot melt adhesive compositions are prepared based on the ingredients mentioned in the following table 1:

| | | Hot melt adhesive A (invention) | Hot melt adhesive B (invention) | Hotmelt adhesive C (comparative) | Hotmelt adhesive D (comparative) | Hot melt adhesive E (comparative) |
|---|---|---|---|---|---|---|
| Indopol H-300 | Plasticizer | — | — | — | 20.0 | 4.5 |
| Escorez 5400 | Tackifying resin | 15.0 | 20.0 | 15.0 | — | — |
| Irganox 1010 | antioxydant | 0.5 | 0.5 | 0.5 | 0.5 | 0.5 |
| Vestoplast EP 2094 | Copolymer A | 45.0 | 42.5 | 54.5 | — | 60.0 |
| Vestoplast 508 | Copolymer B | 39.5 | 37.0 | — | 59.5 | |
| Aerafin 17 | Copolymer PP/PE | — | — | 30.0 | — | — |
| Vistamaxx 8880 | Copolymer PP/PE | — | — | — | 20.0 | 35.0 |
| Enthalpy of crystallization | | 3.8 | 3.3 | 9.3 | 8.9 | 6.7 |

The ingredients are mentioned as weight % compared to the total weight of the hot melt adhesive composition.

Example 2: Peel Performances

Table 2 below provides the peel performances at initial and after ageing as mentioned above.

| | Hot melt adhesive A (invention) | Hot melt adhesive B (invention) | Hot melt adhesive C (comparative) | Hot melt adhesive D (comparative) | Hot melt adhesive E (comparative) |
|---|---|---|---|---|---|
| Viscosity at 149° C. (mPa · s) | 9010 | 8650 | 4300 | 6896 | 4028 |
| Peel at initial (N/inch) | 1.71 | 1.70 | 2.48 | 0.61 | 1.5 |
| Peel after ageing (4 weeks at 55° C.) (N/inch) | 2.15 | 2.28 | 0.53 | 0.21 | 0.19 |

The table 2 clearly shows that the hot melt adhesive compositions according to the invention (A and B) advantageously lead to laminates with improved cohesion properties after ageing at 55° C. for 4 weeks. Indeed, the peel increases advantageously from 1.71 to 2.15 (hot melt A) and from 1.7 to 2.28 (hot melt B).

On comparison, comparative hot melt adhesive C, D and E show a high decrease of the peel after ageing at 55° C. for 4 weeks.

The invention claimed is:

1. Hot melt adhesive composition having an enthalpy of crystallization below 5 J/g and comprising:
   a) at least 60% by weight of a composition a) comprising:
      at least one copolymer A having a needle penetration higher than 15 dmm, wherein the copolymer A comprises from 40 weight % to 80 weight % of 1-butene monomer units; and
      at least (co)polymer B having a needle penetration lower than 15 dmm, wherein the (co)polymer B comprises from 40 weight % to 80 weight % of 1-butene monomer units; and
   b) from 0% to 30% by weight of at least one tackifying resin.

2. Hot melt adhesive composition according to claim 1, wherein the (co)polymer B has an enthalpy of crystallization below 5 J/g.

3. Hot melt adhesive composition according to claim 1, wherein the copolymer A has an enthalpy of crystallization below 5 J/g.

4. Hot melt adhesive composition according to claim 1, wherein:
   the copolymer A comprises one or more $C_{2-20}$ a-olefin monomer units, and
   the (co)polymer B comprises one or more $C_{2-20}$ a-olefin monomer units.

5. Hot melt adhesive composition according to claim 1, wherein;
   the copolymer A comprises from 30 weight % to 70 weight % of $C_{2-20}$ a-olefin monomer units; and/or
   the (co)polymer B comprises from 30 weight % to 70 weight % of $C_{2-20}$ a-olefin monomer units;
   the $C_{2-20}$ a-olefin monomer units being selected from the group consisting of: ethylene, propylene, pentene, dodecene-1, hexadodecene-1, decene-1, nonene-1, heptane-1, hexane-1, propene, dimethylpentene-1, methylnonene-1, trimethylheptene-1, 4-methyl-1-pentene, dimethylpentene-1, ethylpentene-1, methylpentene-1, trimethylpentene-1, and mixtures thereof.

6. Hot melt adhesive composition according to claim 1, wherein the copolymer A has a needle penetration lower than 30 dmm.

7. Hot melt adhesive composition according to claim 1, wherein the (co)polymer B has a needle penetration higher than 5 dmm.

8. Hot melt adhesive composition according to claim 1, wherein the composition a) comprises:
   from 30% to 90% by weight of copolymer(s) A based on the total weight of said composition a); and/or
   from 20% to 80% by weight of (co)polymer(s) B, based on the total weight of said composition a).

9. Hot melt adhesive composition according to claim 1, comprising from 60% to 99% by weight of the composition a), based on the total weight of said hot melt adhesive composition.

10. Hot melt adhesive composition according to claim 1, wherein the content of tackifying resin(s) ranges from 1% to 30% by weight, based on the total weight of said hot melt adhesive composition.

11. Hot melt adhesive composition according to claim 1, wherein the tackifying resin is selected among the following classes:
   a) natural and modified rosins;
   b) glycerol and pentaerythritol esters of natural and modified rosins;
   c) polyterpene resins include hydrogenated polyterpene resins having a Ring and Ball softening point of from about 20° C. to 140° C.;
   d) phenolic-modified terpene resins;
   e) aliphatic (including cycloaliphatic) petroleum hydrocarbon resins (C5) having a Ring and Ball softening point of from about 60° C. to 140° C., said resins resulting from the polymerization of C5-hydrocarbon monomers; and the corresponding hydrogenated derivatives resulting from a subsequent total or partial hydrogenation thereof;
   f) aromatic petroleum hydrocarbons resins (C9) having Ring and Ball softening point of from about 60° C. to 140° C., said resins resulting from the polymerization of C9-hydrocarbon monomers; and the corresponding hydrogenated derivatives resulting from a subsequent total or partial hydrogenation thereof;
   g) aliphatic (including cycloaliphatic) and/or aromatic petroleum resins (C5/C9) having a Ring and Ball softening point of from about 60° C. to 140° C., said resins resulting from the polymerization of C5/C9-hydrocarbon monomers; and the corresponding hydrogenated derivatives resulting from a subsequent total or partial hydrogenation thereof.

12. Hot melt adhesive composition according to claim 1, wherein the (co)polymer B is a copolymer.

13. Hot melt adhesive composition according to claim 1, wherein it does not comprise polyisobutylene.

14. Hot melt adhesive composition according to claim 1, having a Brookfield viscosity measured at 149° C. in the range of from 1,000 mPa·s to 30,000 mPa·s.

15. Hot melt adhesive composition according to claim 1, wherein the weight ratio copolymer(s) A:(co)polymer(s) B ranges from 30:70 to 80:20, in said hot melt adhesive composition.

16. Hot melt adhesive composition according to claim 1, having an enthalpy of crystallization ranging from 0.5 J/g to lower than 5 J/g.

17. Diapers, feminine care pads, or napkins comprising the hot melt adhesive composition as defined in claim 1.

18. Process of manufacturing an assembly product (or laminate) comprising:
   a step (i) of heating at a temperature ranging from 130° C. to 180° C. the hot melt adhesive composition as defined in claim 1, for at least a period of time long enough to render the hot melt adhesive composition liquid enough to be applied on a substrate, then
   a step (ii) of coating said composition on a primary substrate, then
   a step (iii) of putting into contact the coated surface of the primary substrate with the surface of a secondary substrate, so as to form an adhesive joint bonding the two substrates.

19. Assembly product comprising at least two substrates bonded by at least one hot melt adhesive composition as defined in claim 1.

20. The hot melt adhesive according to claim 1, wherein one or more of copolymer A or copolymer B comprises more than 50 weight % of 1-butene monomer units.

* * * * *